United States Patent [19]
Littrell

[11] Patent Number: 5,350,884
[45] Date of Patent: Sep. 27, 1994

[54] EXHIBITION HALL ELECTRICAL FLOOR BOX

[76] Inventor: Gary L. Littrell, 1403 Carlisle Dr., Inverness, Ill. 60010

[21] Appl. No.: 966,720

[22] Filed: Oct. 26, 1992

[51] Int. Cl.⁵ .............................................. H02G 3/12
[52] U.S. Cl. ...................................................... 174/48
[58] Field of Search ................... 174/48, 49; 52/220.1, 52/220.3, 220.4

[56] References Cited

U.S. PATENT DOCUMENTS

| | | | |
|---|---|---|---|
| 4,139,725 | 2/1979 | Guritz et al. | 174/49 |
| 4,529,833 | 7/1985 | Weis | 174/48 |
| 4,536,612 | 8/1985 | Domigan | 174/48 |
| 4,899,506 | 2/1990 | Chapman | 174/48 X |
| 4,967,041 | 10/1990 | Bowman | 174/48 |
| 5,008,491 | 4/1991 | Bowman | 174/48 |
| 5,179,252 | 1/1993 | Yang | 174/48 |

Primary Examiner—Leo P. Picard
Assistant Examiner—David Tone
Attorney, Agent, or Firm—Charles F. Meroni, Jr.

[57] ABSTRACT

The exhibition hall electrical floor box includes a housing having a plurality of chambers therein. Each chamber accommodates a particular type or types of electrical connection therein. Chambers adapted to engage a cylinder type connector therein each have a fitting therein positioned in such a manner as to cause the connector to lie diagonally across corners of the chamber horizontally as well as vertically to produce a box having a significantly decreased height, such decreased height requiring significantly less concrete to be poured to create a flush mounting of the box within the floor.

40 Claims, 10 Drawing Sheets

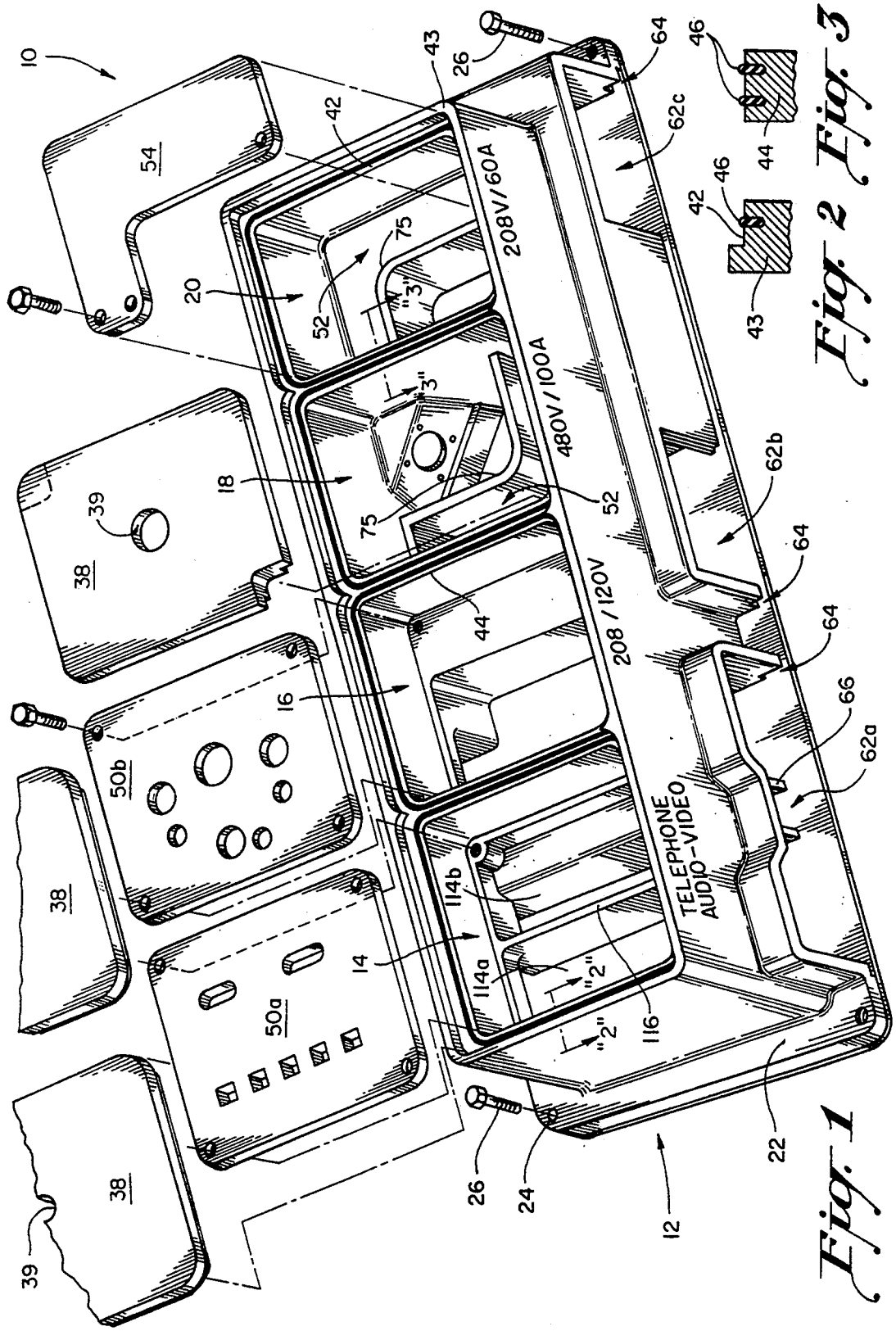

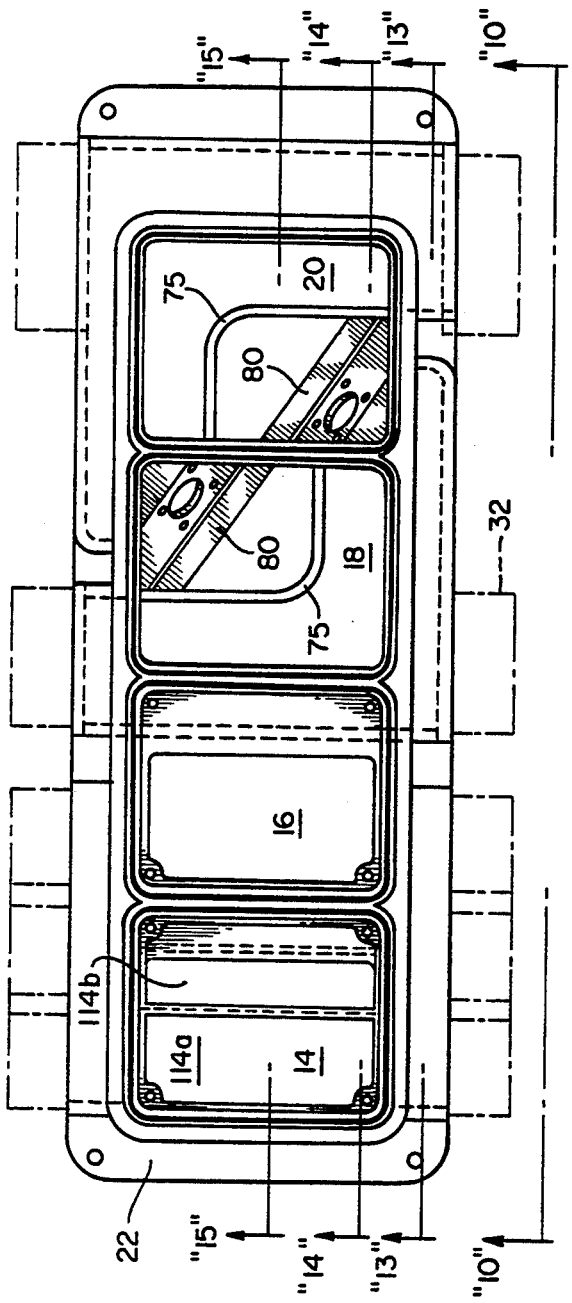
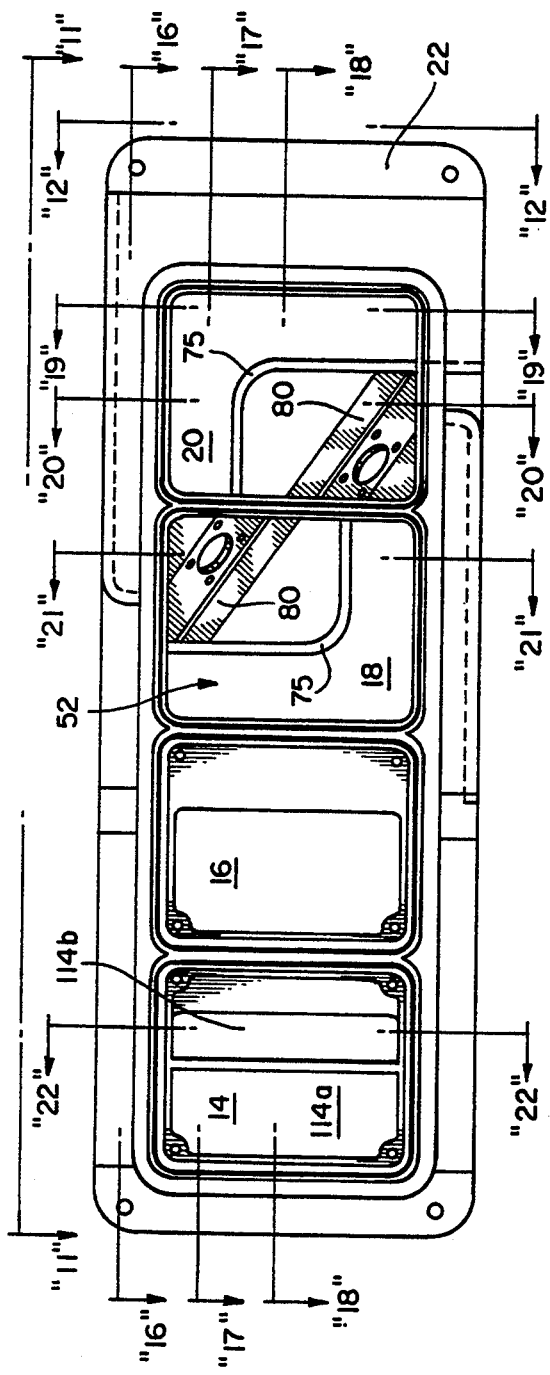

EXHIBITION HALL ELECTRICAL FLOOR BOX

BACKGROUND OF THE INVENTION

1. Field of the Invention

The present invention relates to an electrical floor box for an exhibition hall, the box being of the type to be embedded in a poured concrete floor of the hall. More particularly, the box has a decreased height due to angulated engagement of connectors therein and thus accommodates pouring of a concrete floor which has a significantly decreased thickness while remaining flush therewith, creating significant material and cost savings.

2. Description of the Prior Art

Heretofore various embodiments of an electrical floor box have been proposed.

For example, the Bowman US Pat. No. 4,967,041 and 5,008,491 disclose a floor distribution box for access floors, the box having a curved front to allow same to be swung into a floor opening provided for same, positioning part of the box under the floor.

Also, the Domigan US Pat. No. 4,536,612 discloses a power box for raised floors which has a housing divided into two power sections and an electrically isolated communication section between the power sections.

Further, the Weis U.S. Pat. No. 4,529,833 discloses a floor distribution box comprising opposed transverse walls, a top wall having an outlet opening, a bottom wall, and outwardly biased displaceable end walls secured for inward pivotal displacement. An access opening is provided in each of the end walls and is provided with engagement members in the perimeter thereof for engagement in a respective one of the opposed access openings of a channelway. The outward bias provides a snap-fit engagement of the engagement members in the aligned access openings.

As will be described in greater detail hereinafter the exhibition hall floor box of the present invention differs from those previously proposed by first of all being adapted to have a concrete floor poured therearound, and by providing a box where the depth of concrete to be poured for a flush mounting is significantly decreased by angulation of connectors and fittings therefore within chambers of the box so that the connector lies diagonally across corners of the box as well as being vertically angulated from end to end for greatest efficiency of use of chamber area, to create a box of significantly decreased height.

SUMMARY OF THE INVENTION

According to the invention there is provided an exhibition hall electrical floor box comprising an exhibition hall floor electrical box comprising a housing in the form of a short rectangular box having a base mounting flange extending from a bottom surface thereof, the housing being divided into a plurality of adjacent chambers and having passages therein through which cable passed through conduit engaged to the box may extend into appropriate ones of the chambers, at least one of the chambers being adapted to engage a cylinder type connector via a fitting which is provided in a bottom corner of the chamber and angled relative thereto in such a manner as to cause the cylinder type connector to lie across opposite corners at an angle in both the horizontal and vertical planes.

According to still other features of my invention there is provided an exhibition hall floor electrical box comprising a housing in the form of a rectangular box having a reduced vertical profile, the rectangular box having a base mounting flange about a bottom surface thereof, the housing being divided into a plurality of adjacent chambers and having passages therein through which cable, passed through conduit engaged to the box, may extend into appropriate ones of the chambers, at least one of the chambers being adapted to house a cylinder type connector which is provided in an associated immediately adjacent end of the chamber and is angled relative to the end in such a manner as to cause the cylinder type connector to lie at an angle away from the associated immediately adjacent end of the chamber, the chamber to house a cylinder type connector having an upwardly angled connector wall on which a cylinder type connector can be mounted to extend in an upwardly angled direction towards an opposite end of the chamber associated therewith.

Yet other features of my invention there is provided in combination, an exhibition hall floor electrical box, and an electrical fitting for mounting in the box having wiring attached thereto, the electrical box comprising a housing in the form of a rectangular box having a reduced vertical profile, the rectangular box having a base mounting flange about a bottom surface thereof, the housing being divided into a plurality of adjacent chambers and having passages therein through which cable, passed through conduit engaged to the box, may extend into appropriate ones of the chambers, the chamber to house a cylinder type connector having an upwardly angled connector wall on which a cylinder type connector can be mounted to extend in an upwardly angled direction towards an opposite end of the chamber associated therewith, the chambers each being adapted to house a cylinder type connector which connector is mounted on the upwardly angled connector wall at one end of the chamber associated therewith, the connector being angled relative to the end in such a manner as to cause the cylinder type connector to lie at an angle extending upwardly and away from the associated mounting flange disposed at the adjacent end of the chamber.

Still further features of my invention relate to the combination as described above wherein the rectangular box has a wiring channel underlying and behind the upwardly angled connector wall where the wiring is disposed, and a raceway passageway partially underlying the box at one side of the wiring channel, the raceway passageway being in communication with the wiring channel behind the upwardly angled connector wall, the wiring extending from the connector behind the upwardly angled connector wall through the wiring channel behind the upwardly angled connector wall into the raceway passageway, the raceway passageway extending in a direction generally parallel to one side of the rectangular box, the wiring channel and the raceway passage being compactly oriented relative to the upwardly angled connector wall.

Other and still further features of my invention concerns a combination which includes an exhibition hall floor electrical box, and an electrical fitting for mounting in the box having wiring attached thereto, the electrical box comprising a housing in the form of a rectangular box having a reduced vertical profile, the rectangular box having a base mounting flange about a bottom surface thereof, the housing being divided into a plurality of adjacent chambers and having passages therein through which cable, passed through conduit engaged to the box, may extend into appropriate ones of the chambers, at least a side by side pair of the chambers each being adapted to house a cylinder type connector, the side by side pair of the chambers each having an upwardly angled connector wall at one end of the chamber, the cylinder type connectors each being mounted on an associated one of the upwardly angled connector walls causing the cylinder type connector to extend in an upwardly angled direction towards an opposite end of the chamber associated therewith, the upwardly angled connector walls in the adjacent side-by-side chambers being located at an opposite end of the chambers thus enabling the upwardly angled connectors in side-by-side chambers to extend in opposite directions relative to one another when mounted in their respective chambers on the upwardly angled connector walls.

BRIEF DESCRIPTION OF THE DRAWINGS

FIG. 1 is an exploded perspective view of an electrical floor box made in accordance with the teachings of the present invention.

FIG. 2 is a cross sectional view through a portion of an exterior wall of the box and is taken along line 2—2 of FIG. 1.

FIG. 3 is a cross sectional view through a portion of an interior cheer defining wall of the box and is taken along line 3—3 of FIG. 1.

FIG. 8 is a top plan view of an empty box showing feeder conduits therebeneath in phantom.

FIG. 9 is a top plan view similar to FIG. 8 but without conduits.

DESCRIPTION OF THE PREFERRED EMBODIMENTS

Figure 4:
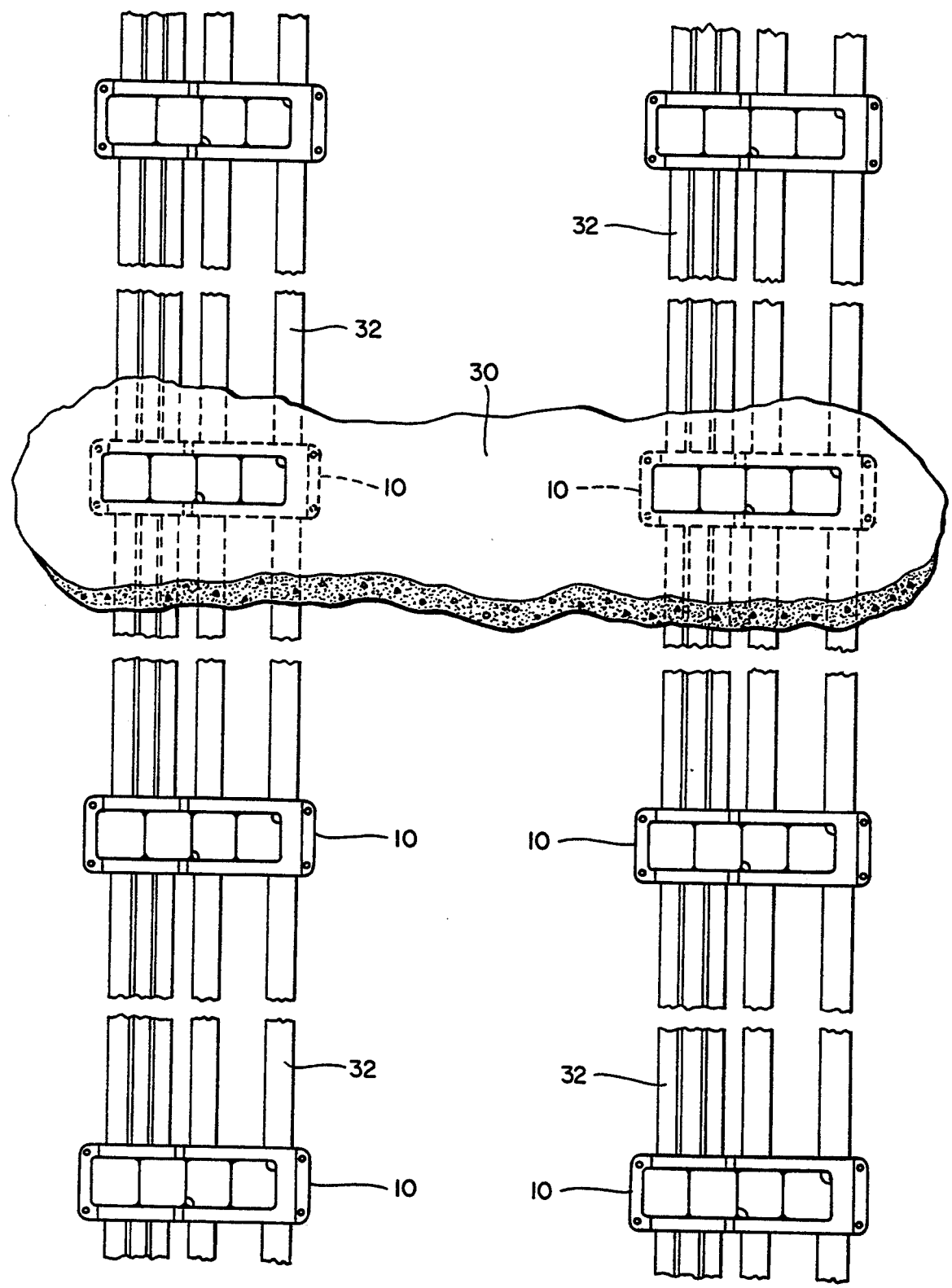
FIG. 4 is a top plan view showing several boxes engaging a plurality of conduits with a portion of a concrete floor shown encasing two of the boxes.

Referring now to the drawings in greater detail, there is illustrated therein an exhibition hall floor electrical box made in accordance with the teachings of the present invention and generally identified by the reference numeral 10.

Figure 5:
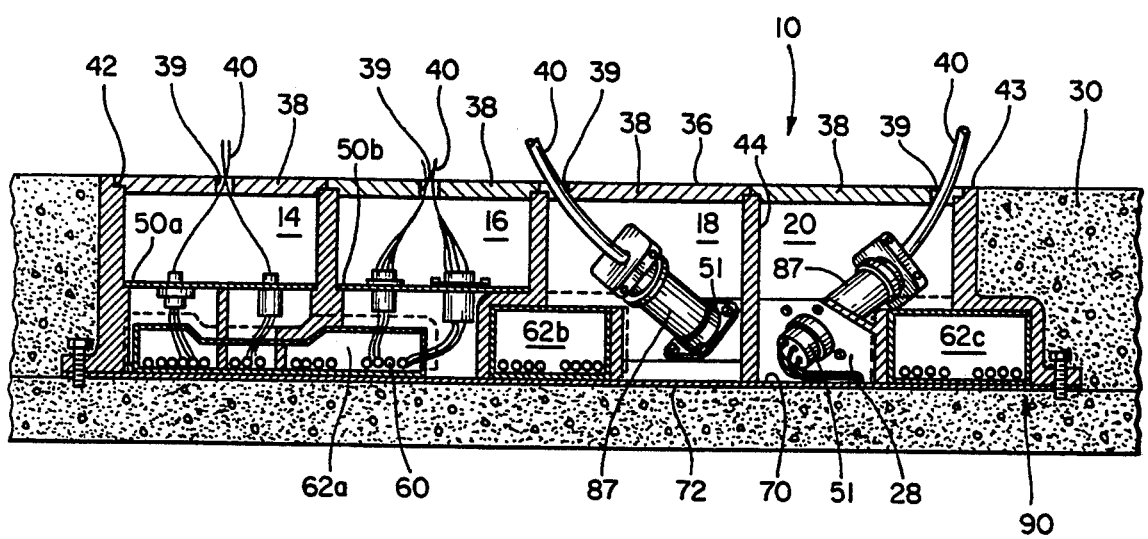
FIG. 5 is a longitudinal cross sectional view through one box showing same embedded in a concrete floor, and showing connectors seated therein.

As shown, the box 10 includes a housing 12 which, in the illustrated embodiment, is divided into four chambers 14, 16, 18 and 20. The housing 12 further includes a base mounting flange 22 which has corner bores 24 therein. These corner bores 24 each accept a screw 26 therein which is used to secure the box to a concrete underlayment 28 (FIG. 5).

Inasmuch as the box 10 is proposed for use in a floor 30 of an exhibition hall, it must necessarily accommodate the needs of an exhibitioner. For this reason, as shown on FIG. 1, the chambers 14–20 are provided, with each being clearly defined. Further, inasmuch as feed line conduit 32 (FIG. 4) must be accessible via the box 10, each chamber 14–20 is adapted to engage a particular source of power therein into which an exhibitioner may simply tap, as desired.

Furthermore, because a top surface 36 (FIG. 5) of the box 10 is to be flush with the concrete floor or slab 30 to be poured therearound, each chamber 14–20 must be covered to protect the content of same.

Such covers 38 are planar elements which are chamber specific, each having a port 39 therein through which an access cable 40 may exit the chamber.

To accommodate placement of such covers 38, an inner shoulder 42 is provided about the periphery 43 of the box 10, with chamber defining inner walls 44 also forming a continuation of the shoulder 42.

As shown in FIGS. 2 and 3, a seal 46 is provided for each cover 38 to make the engagement between the cover 38 and shoulder 42 water tight.

Inasmuch as various types of connections are to be accommodated within the cheers 14–20, a mounting platform may be required in certain instances for engaging connectors thereon. Two such proposed platforms 50a and 50b are shown as seating within chambers 14 and 16, respectively and supported therein upon support ledges 51.

Further, as shown with respect to chambers 18 and 20, if it is desired to cover exposed wires or cables 60 within channels 52 provided for same, an inner cover plate 54 may be provided.

Figures 6, 7:
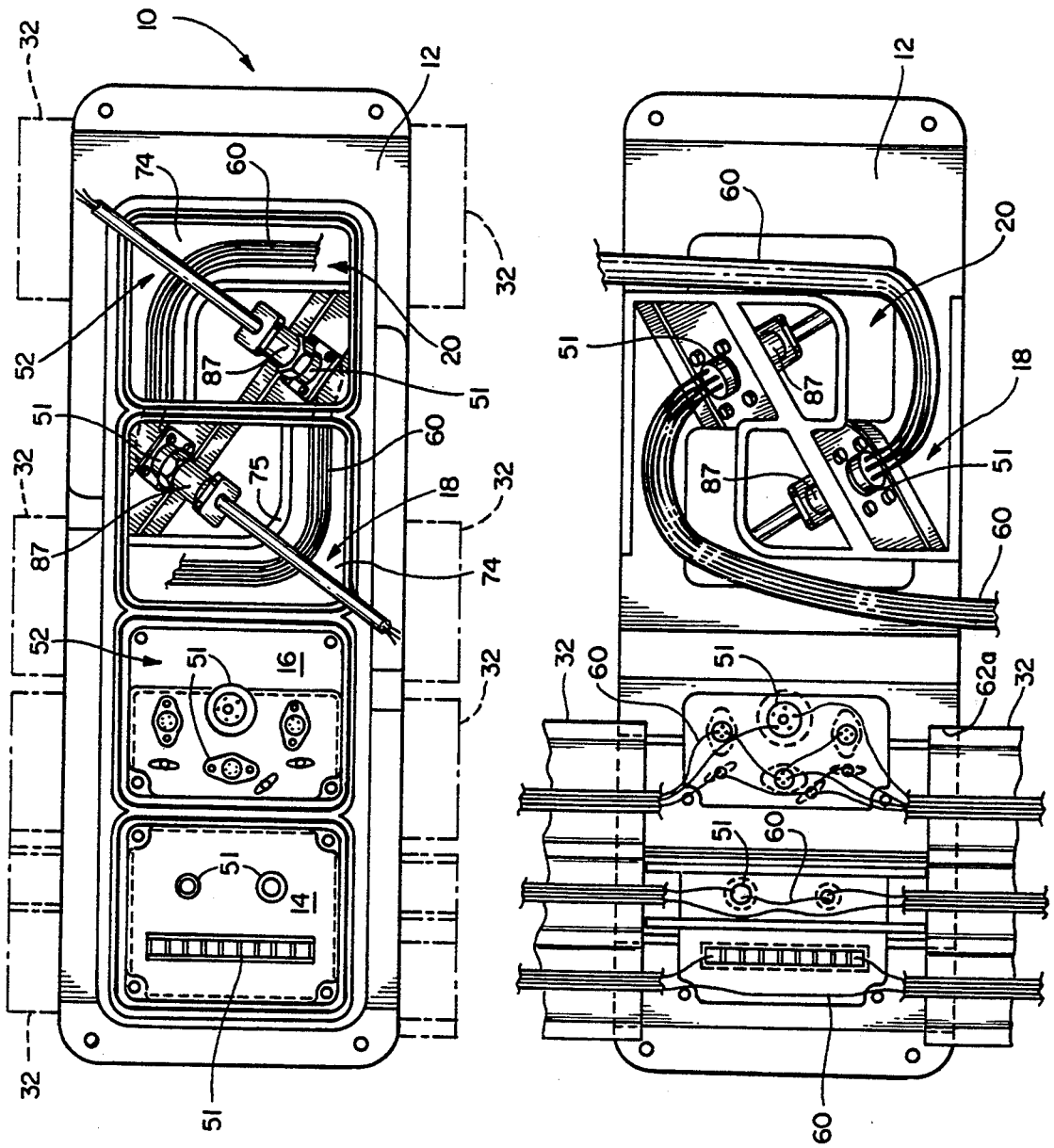
FIG. 6 is a top plan view of the box showing connectors and fittings thereof.
FIG. 7 is a bottom plan view of the box showing connectors and fittings thereof.
Figure 10:
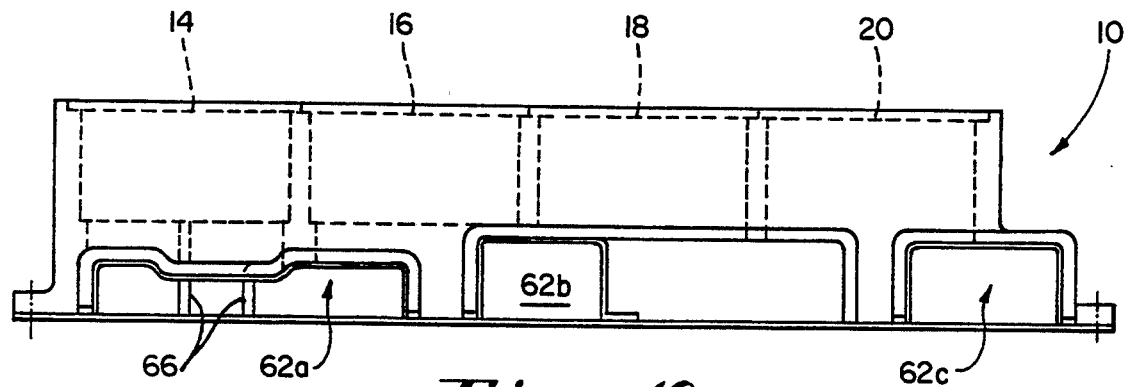
FIG. 10 is a front view of the box and is taken along line 10—10 of FIG. 8.
Figure 11:
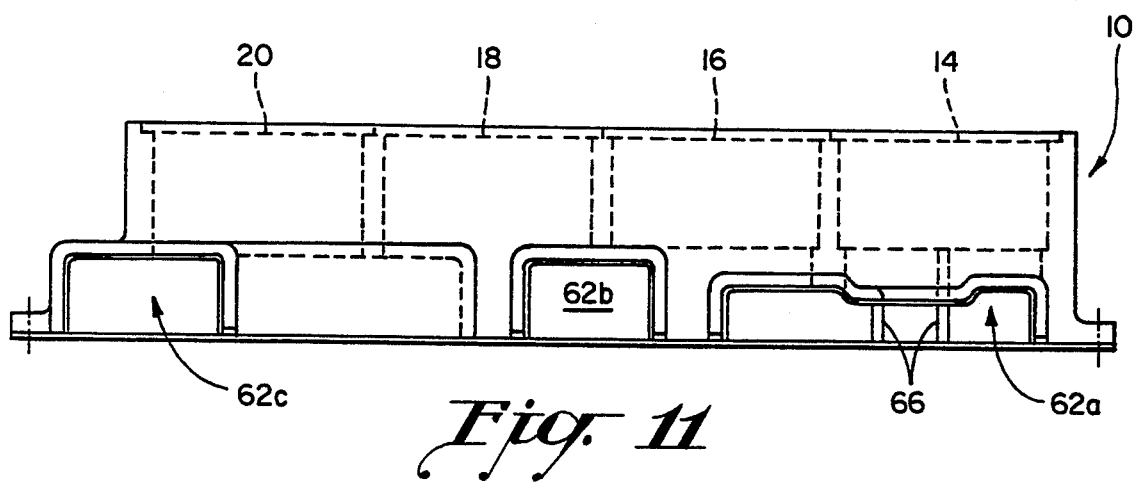
FIG. 11 is a rear view of the box and is taken along line 11—11 of FIG. 9.
Figure 12:
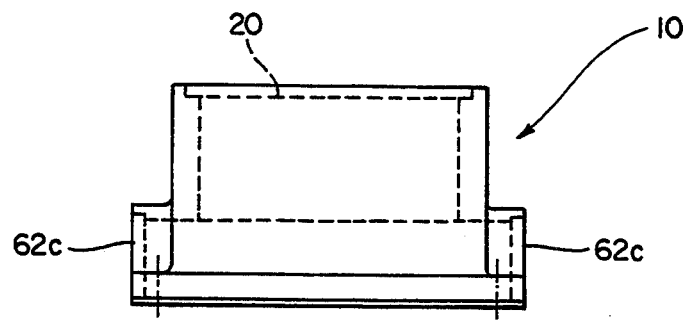
FIG. 12 is an end view of the box and is taken along line 12—12 of FIG. 9.
Figure 13:
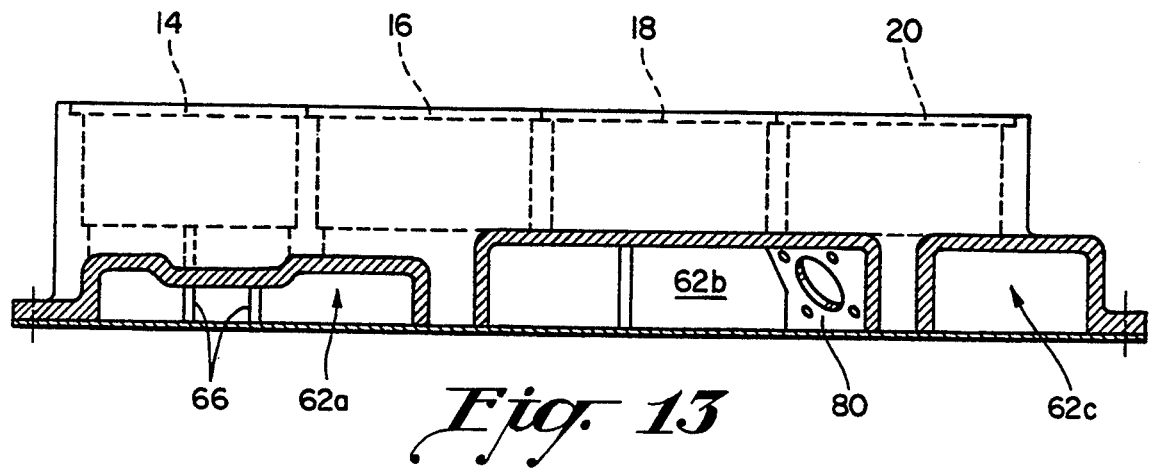
FIG. 13 is a longitudinal cross sectional view through the box taken along line 13—13 of FIG. 8.
Figure 14:
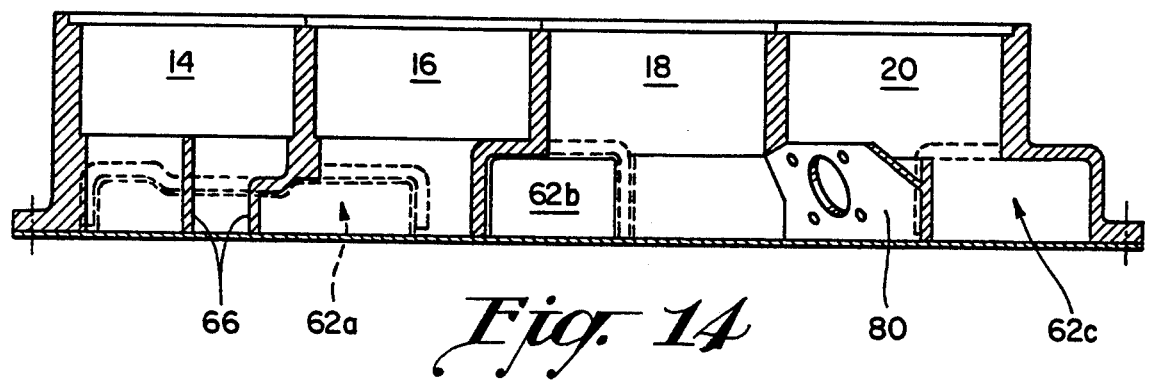
FIG. 14 is a longitudinal cross sectional view through the box taken along line 14—14 of FIG. 8.
Figure 15:
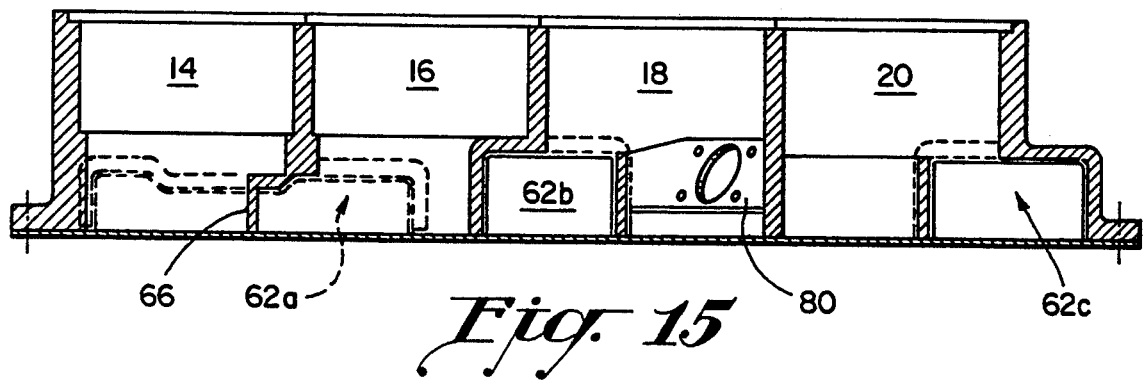
FIG. 15 is a longitudinal cross sectional view through the box and is taken along line 15—15 of FIG. 8.
Figure 16:
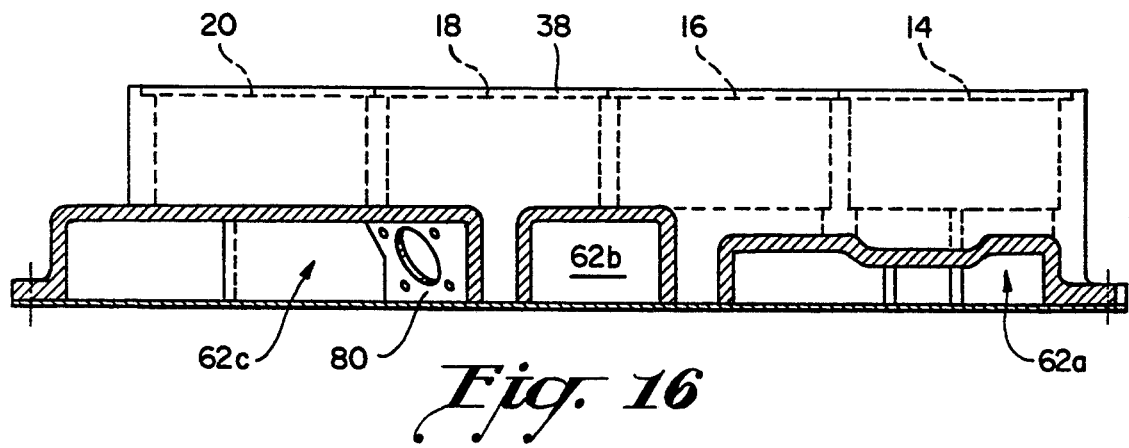
FIG. 16 is a longitudinal cross sectional view taken along line 16—16 of FIG. 9.
Figure 17:
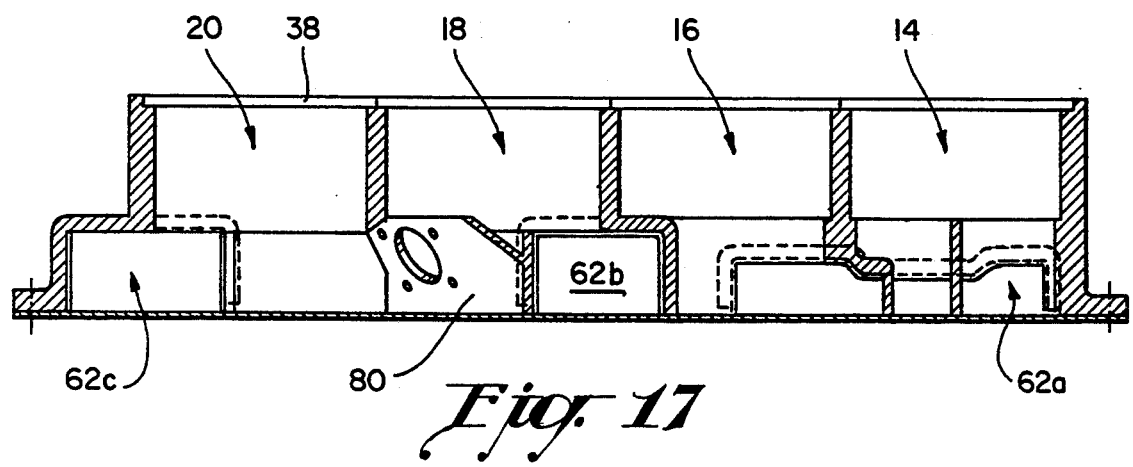
FIG. 17 is a longitudinal cross sectional view taken along line 17—17 of FIG. 9.
Figure 18:
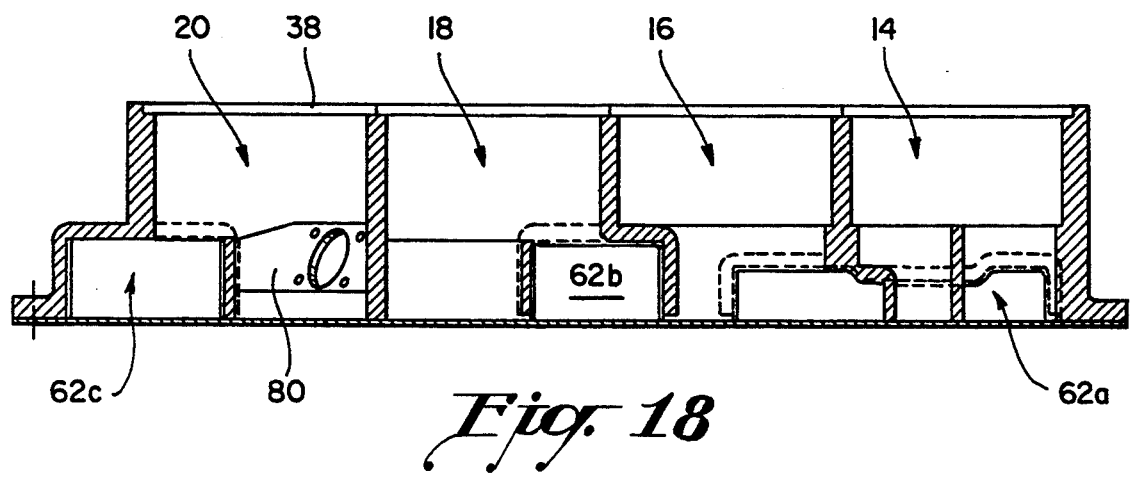
FIG. 18 is a longitudinal cross sectional view taken along line 18—18 of FIG. 9.
Figure 19:
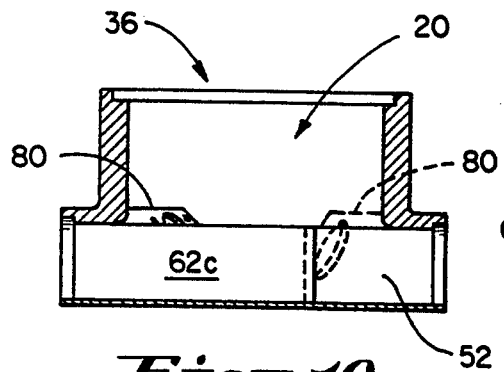
FIG. 19 is a cross sectional view through the box and is taken along line 19—19 of FIG. 9.
Figure 20:
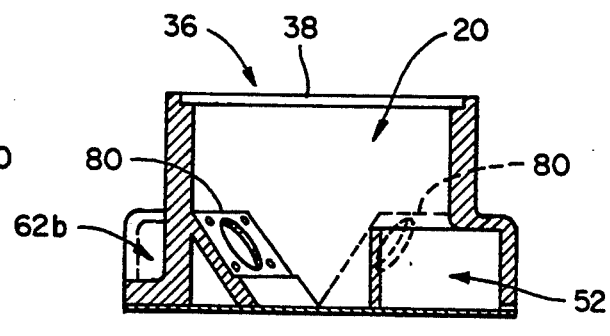
FIG. 20 is a cross sectional view through the box and is taken along line 20—20 of FIG. 9.
Figure 21:
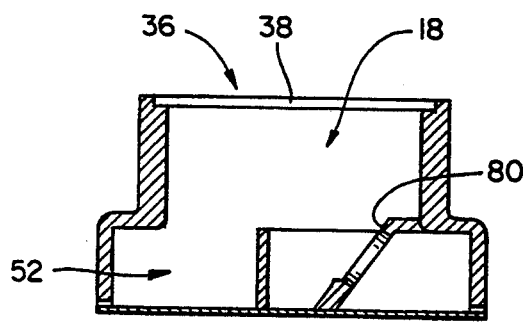
FIG. 21 is a cross sectional view through the box and is taken along line 21—21 of FIG. 9.
Figure 22:
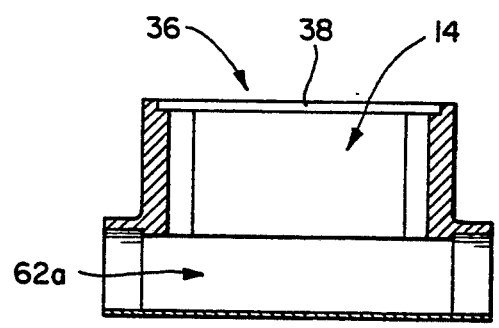
FIG. 22 is a cross sectional view through the box and is taken along line 22—22 of FIG. 9.

Turning for a brief glance at FIG. 6, it will be seen here, in a top view of the box 10, that the platforms 50a and 50b can be designed to accommodate any desired number or pattern of fittings 51, the fittings 51 being of any desired configuration such as those shown here for the particular embodiment of the box 10 disclosed.

As best shown in FIG. 4, the box 10 creates a means through which cables 60 running through conduits 32 in a floor 30 of the exhibition hall can be tapped. In this regard, it is inherent that the box 10 somehow communicate with the cables 60 in the conduits 32. Such communication is shown best in FIGS. 5 and 7.

As the box 10 must accommodate engagement of the conduits 32 for allowing access to the cables 60 therein, passages 62 must be provided therein for feeding of the cables 60 into the appropriate chambers. Such passages 62a, 62b, and 62c are each shown to have a configuration which tightly engages one end of a portion of conduit 32. To make this engagement sturdier, a spacing is left between adjacent passages 62 so that concrete poured after placement of the box 10 will fill the spaces adding extra depth to the concrete and thereby strengthening the engagement area. To ease engagement of the conduits 32 within the passages 62, each passage 62 is notched, as shown at 64. Also, if desired, the passages 62 may be compartmented by the provision of inset dividing walls 66.

Cables 60 are pulled from within the conduit 32 in known manner and engaged to appropriate fittings 51, as shown in FIG. 7. Obviously, an opposite side of the box 10 also has a series of passages 62 therein which engage conduits 32 leading away from the box 10, perhaps to a further box 10. Also, it will be understood that a bottom 70 of the box 10 is covered, the cover 72 being removed here to show the connections.

Specifically configured cable channels 52 are provided in chambers 18 and 20 in this particular embodiment of the box 10. As best shown in FIG. 7, the channels 52 feed into the contiguous chamber opposite to that within which they are located. Thus, the channel 52 in chamber 18 feeds cable 60 to engage the fitting 51 in chamber 20 and the channel 52 in chamber 20 feeds cable 60 to the fitting 51 in chamber 18. This arrangement together with the provision of radiused corners 75 in the channel 52 eases pulling of the cable 60 and ultimately allows for efficient use of the interior space as will be defined hereinafter.

It will be seen that these channels 52 in the chambers 18 and 20 are identical, L shaped paths which are rotated 180 degrees one from the other. Thus, the cover plate 54 may be used in either chamber 18 or 20 by simply rotating the cover plate 54 by 180 degrees.

Turning now to a study of FIGS. 8–22, the structures forming the box 10 are readily seen. As shown in these Figures, the fittings 51 in chambers 18 and 20 are uniquely positioned. In this respect, it will be seen that each fitting 51 is secured to a wedge shaped support or wall 80 which is seated in an upwardly angled posture in one lower corner 82 of the chamber 20, this corner 82 being unencompassed by the channel 52 within the chamber 20. The upward angulation is created by placing a base 84 of the wedge 80 further from the corner 82 than an upper edge 86 of the wedge 80 at such an angle that any cylinder type connector 87 engaged to the fitting 51 would extend into an opposite corner 88 overlaying the channel 52 at a level above the channel 52, lying across opposite corners 82 and 88 in both the horizontal and vertical planes. By creating such angulation the required height for the box 10 is significantly decreased. This decrease in height allows the box 10 to be "buried" in less concrete.

By saving the pouring of even one inch of concrete in a building structure of a million square feet, it will be understood that significant cost savings will be realized. Also, the weight of the thinner concrete floor will be substantially reduced, providing a relief from stress to supporting structures in certain situations.

Figure 23:
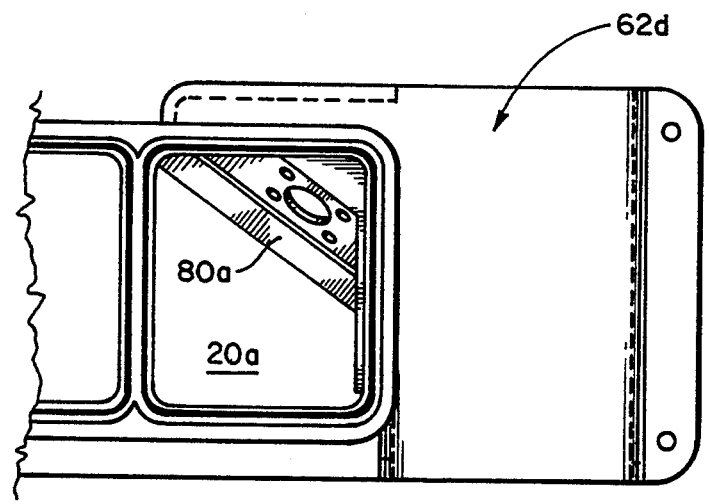
FIG. 23 is a partial top plan view of the box showing a second end chamber embodiment.
Figure 24:
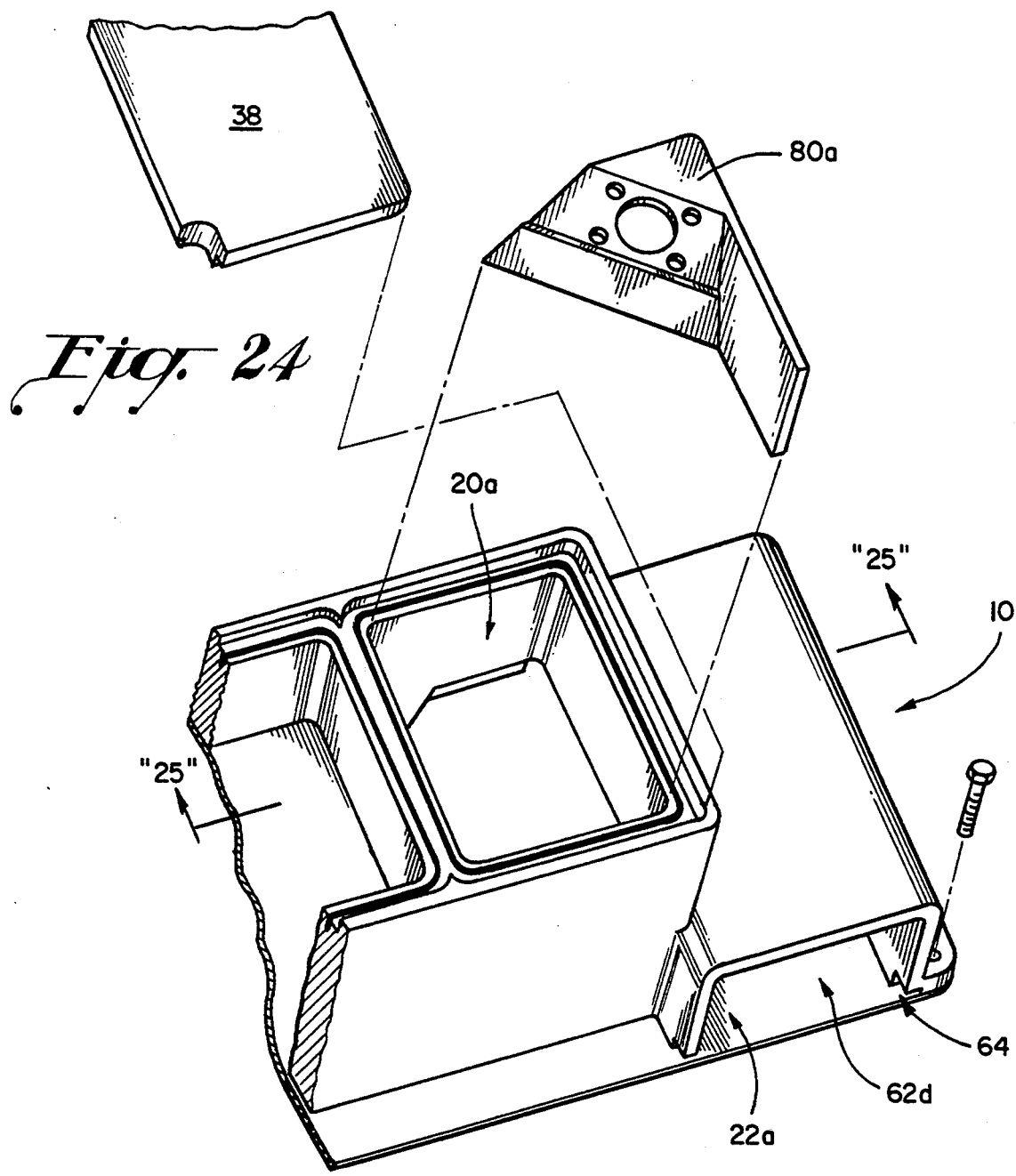
FIG. 24 is an exploded perspective view of the structures of FIG. 23.
Figure 25:
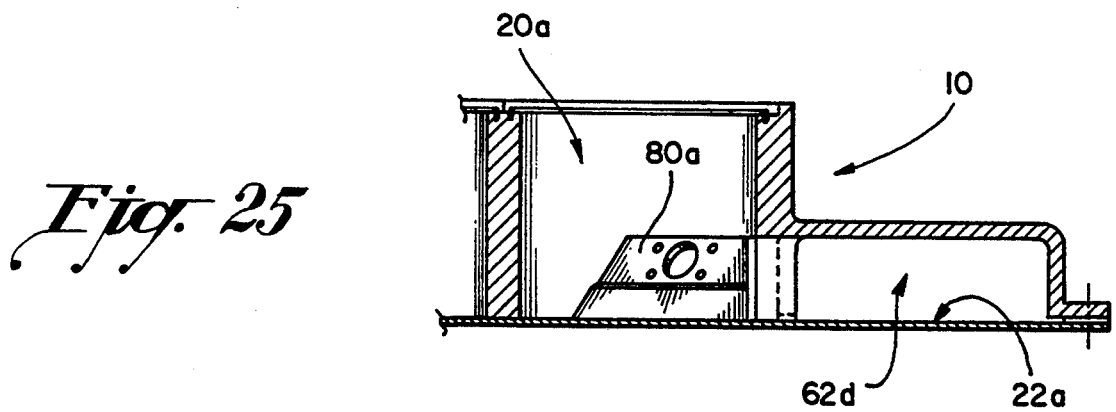
FIG. 25 is a longitudinal cross sectional view taken along line 25—25 of FIG. 24.

Although the wedged shaped slanted wall 80 for the fitting has been shown to be formed integral with walls of the chambers 18 and 20, it will be seen from FIGS. 23, 24 and 25 that the fitting support or wall 80a can also be provided as a separate entity, which could be incorporated into any chosen, empty end chamber 20a. Further, these Figures show that a channel for cables is not an absolute necessity, but is rather provided to ease pulling of the cable into the chamber.

In this embodiment the passage 62d for receiving the conduit 32 is provided adjacent the chamber 20a and upon an extended base flange 22a, with the cable 60 merely curving into the chamber 20a and into engagement with the fitting 51 mounted on support 80a.

The box 10 also offers further versatility. In this respect, it will be seen that, if necessary or expedient, the chambers 14–20 can be divided into subchambers as has been done to chamber 14 in the disclosed embodiment.

Particularly with reference to the chamber 14 as an example, it has been desired in this embodiment to provide a duality of services from the chamber 14. Thus, as shown, the chamber 14 has been divided into subchambers, 114a and 114b. Such division has been simply formed by provision of a center isolating wall 116 across the chamber 14, creating one subchamber 114a for one type of service, such as telephone or audio, and a second subchamber 114b for a second type of service, such as audio. Obviously any such services must be supplied within a single conduit 32 and must require a minimal amount of cable 60.

Further, the conduit 32 engaged below the chamber 14 may also supply cable 60 required for the chamber 16 as illustrated in the disclosed embodiment.

Although a preferred embodiment for the box 10 has been disclosed herein, it is not to be construed as limiting. The embodiment disclosed should be considered as an example of what can be accommodated by the box 10 and so long as the fittings 51 for the cylindrical connectors 87 remains angled as taught herein, the box 10 will still offer the benefit of being shorter and requiring less concrete to be poured therearound.

As described above the exhibition hall electrical floor box 10 of the present invention has a number of advantages, some of which have been described above and others of which are inherent in the invention. Also, modifications can be proposed to the box 10 without departing from the teachings herein. Accordingly the scope of the invention is only to be limited as necessitated by the accompanying claims.

I claim:

1. An exhibition hall floor electrical box comprising a housing in the form of a short rectangular box having a base mounting flange about a bottom surface thereof, said housing being divided into a plurality of adjacent chambers and having passages therein through which cable, passed through conduit engaged to said box, may extend into appropriate ones of said chambers, at least one of said chambers being adapted to engage a cylinder type connector via a fitting which is provided in a bottom corner of said chamber and is angled relative to the corner in such a manner as to cause the cylinder type connector to lie across opposite corners of the chamber at an angle in both the horizontal and vertical planes.

2. The box of claim 1 wherein one of said chambers is divided into subchambers by the provision of an isolating wall therein extending across the chamber.

3. The box of claim 2 wherein a connector mounting platform is supported above a base of said box by a peripheral ledge within a chamber requiring such platform.

4. The box of claim 3 wherein each chamber has a cover.

5. The box of claim 4 wherein each cover is supported on a shoulder of walls defining said chamber.

6. The box of claim 5 wherein said wall shoulder includes a seal member thereon to create a fluid tight engagement between said shoulder and a cover mounted thereover.

7. The box of claim 6 wherein said cover has an opening therein through which an access cable end extends.

8. The box of claim 7 wherein each chamber includes an access passage therein for allowing engagement of conduit carried cable to at least one fitting of said box.

9. The box of claim 8 wherein said at least one cylinder type connector fitting is supported on a fitting support wall and is engaged to a cable fed thereto via a cable channel provided in a contiguous chamber, said channel terminating behind said fitting support wall.

10. The box of claim 9 wherein each channel is L shaped and has a cover mounted thereover.

11. The box of claim 9 wherein two such contiguous chambers are provided.

12. The box of claim 11 wherein said fitting support wall is unitary with said box.

13. The box of claim 9 wherein said fitting support wall comprises a wedge seated within a bottom corner of said chamber, said wedge having means for engaging a fitting thereto and lying across said corner at an acute angle relative to a floor of said box, a bottom edge of said wedge being positioned further from said corner than a top edge of said wedge.

14. The box of claim 13 wherein an opening is provided in said wedge within which said fitting seats, said opening having an angled alignment with a top edge of an opposite corner of said chamber.

15. The box of claim 14 wherein said conduit engaging passageways are spaced from one another.

16. The box of claim 15 wherein such a passageway is compartmented by upright inset walls.

17. The box of claim 8 wherein a fitting support wall for engaging a cylinder type connector is a separate structure engageable within an end chamber of said box and is fed a connecting cable via a contiguous passageway created at a corresponding end of said box.

18. A compartmented exhibition hall floor electrical box comprising a housing in the form of a short rectangular box having a base mounting flange about a bottom surface thereof, said housing being divided into a plurality of adjacent chambers and having passages therein through which cable, passed through conduit engaged to said box, may extend into appropriate ones of said chambers, at least one of said chambers being adapted to engage a cylinder type connector via a fitting which is provided in a bottom corner of said chamber and is angled relative to the corner in such a manner as to cause the cylinder type connector to lie across opposite corners of the chamber at an angle in both the horizontal and vertical planes and further having at least one chamber divided into subchambers by the provision of an isolating wall therein extending across the chamber.

19. The box of claim 18 wherein a connector mounting platform is supported above a base of said box by a peripheral ledge within a chamber requiring such platform.

20. The box of claim 19 wherein each chamber has a cover.

21. The box of claim 20 wherein each cover is supported on a shoulder of walls defining said chamber.

22. The box of claim 21 wherein said wall shoulder includes a seal member thereon to create a fluid tight engagement between said shoulder and a cover mounted thereover.

23. The box of claim 22 wherein said cover has an opening therein through which an access cable end extends.

24. The box of claim 23 wherein each chamber includes an access passage therein for allowing engagement of conduit carried cable to at least one fitting of said box.

25. The box of claim 24 wherein said at least one cylinder type connector fitting is supported on a fitting support wall and is engaged to a cable fed thereto via a cable channel provided in a contiguous chamber, said channel terminating behind said fitting support wall.

26. The box of claim 25 wherein each channel is L shaped and has a cover mounted thereover.

27. The box of claim 25 wherein two such contiguous chambers are provided.

28. The box of claim 27 wherein said fitting support wall is unitary with said box.

29. The box of claim 25 wherein said fitting support wall comprises a wedge seated within a bottom corner of said chamber, said wedge having means for engaging a fitting thereto and lying across said corner at an acute angle relative to a floor of said box, a bottom edge of said wedge being positioned further from said corner than a top edge of said wedge.

30. The box of claim 29 wherein an opening is provided in said wedge within which said fitting seats, said opening having an angled alignment with a top edge of an opposite corner of said chamber.

31. The box of claim 30 wherein said conduit engaging passageways are spaced from one another.

32. The box of claim 31 wherein such a passageway is compartmented by upright inset walls.

33. The box of claim 24 wherein a fitting support wall for engaging a cylinder type connector is a separate structure engageable within an end chamber of said box and is fed a connecting cable via a contiguous passageway created at a corresponding end of said box.

34. An exhibition hall floor electrical box comprising a housing in the form of a rectangular box having a reduced vertical profile, the rectangular box having a base mounting flange about a bottom surface thereof, said housing being divided into a plurality of adjacent chambers and having passages therein through which cable, passed through conduit engaged to said box, may extend into appropriate ones of said chambers, at least one of said chambers being adapted to house a cylinder type connector which is provided in an associated immediately adjacent end of said chamber and is angled relative to the end in such a manner as to cause the cylinder type connector to lie at an angle away from the associated immediately adjacent end of said chamber, the chamber to house a cylinder type connector having an upwardly angled connector wall on which a cylinder type connector can be mounted to extend in an upwardly angled direction towards an opposite end of the chamber associated therewith.

35. The exhibition hall floor electrical box of claim 34 wherein the rectangular box has wiring channels underlying and behind said upwardly angled connector walls at opposite ends of the side by side chambers where said wiring is disposed, and raceway passageways partially underlying the box and extending along the side by side chambers each connected to one of the wiring channels, the raceway passageways each being in communication with said wiring channel behind an associated one of said upwardly angled connector walls, the raceway passageways extending in directions generally parallel to sides of the chambers of the rectangular box, the wiring channel and the raceway passage being compactly oriented relative to the upwardly angled connector wall.

36. The exhibition hall floor electrical box of claim 34 wherein the rectangular box has a wiring channel underlying and behind said upwardly angled connector wall where wiring is to be disposed, and a raceway passageway partially underlying the box at one side of said wiring channel, the raceway passageway being in communication with said wiring channel behind said upwardly angled connector wall support, the upwardly angled connector wall being oriented relative to the chamber enabling wiring to be extended through the wiring channel behind the upwardly angled connector wall into the raceway passageway, the raceway passageway extending in a direction generally parallel to one side of the rectangular box, the wiring channel and the raceway passageway being compactly oriented relative to the upwardly angled connector wall.

37. In combination, an exhibition hall floor electrical box, and an electrical fitting for mounting in the box having wiring attached thereto, the electrical box comprising a housing in the form of a rectangular box having a reduced vertical profile, the rectangular box having a base mounting flange about a bottom surface thereof, said housing being divided into a plurality of adjacent chambers and having passages therein through which cable, passed through conduit engaged to said box, may extend into appropriate ones of said chambers, the chamber to house a cylinder type connector having an upwardly angled connector wall on which a cylinder type connector can be mounted to extend in an upwardly angled direction towards an opposite end of the chamber associated therewith, said chambers each being adapted to house a cylinder type connector which connector is mounted on said upwardly angled connector wall at one end of said chamber associated therewith, said connector being angled relative to the end in such a manner as to cause the cylinder type connector to lie at an angle extending upwardly and away from the associated mounting flange disposed at the adjacent end of said chamber.

38. The combination of claim 37 wherein the rectangular box has a wiring channel underlying and behind said upwardly angled connector wall where said wiring is disposed, and a raceway passageway partially underlying the box at one side of said wiring channel, the raceway passageway being in communication with said wiring channel behind said upwardly angled connector wall, the wiring extending from the connector behind said upwardly angled connector wall through the wiring channel behind the upwardly angled connector wall into the raceway passageway, the raceway passageway extending in a direction generally parallel to one side of the rectangular box, the wiring channel and the raceway passage being compactly oriented relative to the upwardly angled connector wall.

39. In combination, an exhibition hall floor electrical box, and an electrical fitting for mounting in the box having wiring attached thereto, the electrical box comprising a housing in the form of a rectangular box having a reduced vertical profile, the rectangular box having a base mounting flange about a bottom surface thereof, said housing being divided into a plurality of adjacent chambers and having passages therein through which cable, passed through conduit engaged to said box, may extend into appropriate ones of said chambers, at least a side by side pair of said chambers each being adapted to house a cylinder type connector, the side by side pair of the chambers each having an upwardly angled connector wall at one end of the chamber, said cylinder type connectors each being mounted on an associated one of the upwardly angled connector walls causing the cylinder type connector to extend in an upwardly angled direction towards an opposite end of the chamber associated therewith, the upwardly angled connector walls in the adjacent side-by-side chambers being located at an opposite end of the chambers thus enabling the upwardly angled connectors in side-by-side chambers to extend in opposite directions relative to one another when mounted in their respective chambers on said upwardly angled connector walls.

40. The combination of claim 39 wherein the rectangular box has a wiring channel underlying and behind said upwardly angled connector wall where said wiring is disposed, and a raceway passageway partially underlying the box at one side of said wiring channel, the raceway passageway being in communication with said wiring channel behind said upwardly angled connector wall, the wiring extending from the connector behind said upwardly angled connector wall through the wiring channel into the raceway passageway, the raceway passageway extending in a direction generally parallel to one side of the rectangular box, the wiring channel and the raceway passage being compactly oriented relative to the upwardly angled connector wall.

* * * * *